US008296187B2

(12) United States Patent  (10) Patent No.: US 8,296,187 B2
Light et al.  (45) Date of Patent: *Oct. 23, 2012

(54) SYSTEM AND METHOD FOR STORAGE AND RETRIEVAL OF INFORMATION SUBJECT TO AUTHORIZATION BY A DATA CONTROLLER

(75) Inventors: Elliott D. Light, Rockville, MD (US); Ali Ersheid, Pacific Grove, CA (US)

(73) Assignees: Paypal, Inc., San Jose, CA (US); Paypal International Limited, Dublin (IE)

( * ) Notice: Subject to any disclaimer, the term of this patent is extended or adjusted under 35 U.S.C. 154(b) by 215 days.

This patent is subject to a terminal disclaimer.

(21) Appl. No.: 12/616,101

(22) Filed: Nov. 10, 2009

(65) Prior Publication Data

US 2010/0057587 A1    Mar. 4, 2010

Related U.S. Application Data

(63) Continuation of application No. 09/559,778, filed on Apr. 27, 2000, now Pat. No. 7,617,125, which is a continuation-in-part of application No. 09/167,873, filed on Oct. 7, 1998, now Pat. No. 6,092,053.

(51) Int. Cl.
*G06Q 30/00*  (2012.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| 4,799,156 A | 1/1989 | Shavit et al. |
| 5,715,314 A | 2/1998 | Payne et al. |
| 5,724,424 A | 3/1998 | Gifford |
| 5,794,207 A | 8/1998 | Walker et al. |
| 5,855,007 A | 12/1998 | Jovicic et al. |
| 5,960,411 A | 9/1999 | Hartman et al. |
| 5,987,140 A | 11/1999 | Rowney et al. |
| 6,119,101 A | 9/2000 | Peckover |

(Continued)

FOREIGN PATENT DOCUMENTS

WO    97/03410 A1    1/1997

(Continued)

OTHER PUBLICATIONS

IBM takes charge of E-Commerce, Moeller, Ziff-Davis, Apr. 29, 1996.*

(Continued)

*Primary Examiner* — James Zurita
(74) *Attorney, Agent, or Firm* — Kenyon & Kenyon LLP

(57) ABSTRACT

A system and method for storage and retrieval of information subject to authorization by a data controller that allows information for purchasing and other information exchange to occur only for authorized parties. A data subject place information abbot the data subject into a data repository controlled by a data controller. The data controller authorizes a data recipient to obtain that data subject data when authorized by a data subject. Such transactions as purchases of goods and services and applying for college admission are the types of transactions contemplated. The data repository places client software on the computer of the data recipient thereby signifying that the data recipient is authorized. Thereafter, the data recipient can receive information about the data subject when the data subject accepts and offer from the data recipient.

9 Claims, 5 Drawing Sheets

U.S. PATENT DOCUMENTS

| | | |
|---|---|---|
| 6,282,522 B1 | 8/2001 | Davis et al. |
| 6,915,271 B1 | 7/2005 | Meyer et al. |
| 7,308,426 B1 | 12/2007 | Pitroda |
| 7,937,312 B1 * | 5/2011 | Woolston ........................ 705/37 |
| 2001/0011250 A1 | 8/2001 | Paltenghe et al. |

FOREIGN PATENT DOCUMENTS

WO            97/26612 A1     7/1997

OTHER PUBLICATIONS

Ralph Kimball, Intelligent Enterprise. San Mateo: Jan. 5, 1999. vol. 2, Iss. 1; p. 70, downloaded from ProQuest on the Internet on Jun. 20, 2009, 6 pages.*

Kimball, Ralph, "Clicking with your customer," Intelligent Enterprise, San Mateo: Jan. 5, 1999. vol. 2, Iss. 1; p. 70, downloaded from ProQuest on the Internet on Jun. 20, 2009, 6 pages.

Greene, Robert, "Online College Applications, Pushing Out Paper," Sep. 1, 2997, St. Louis Post-Dispatch; St. Louis, Mo.

McKenna, Patrick, "Internet Money Is Blue Not Green," p. 1, Jun. 1997.

Bank Technology news, "CyberCash Applies a digital Makeover," pp. 1-2, Oct. 1998.

Moeller, Michael, "IBM Takes Charge of E-commerce," PC Week, pp. 1-2, Apr. 1998.

Freeman, Eva, "How to Move E-cash Around the Internet," pp. 1-2, Jun. 1997.

* cited by examiner

SYSTEM AND METHOD FOR STORAGE AND RETRIEVAL OF INFORMATION SUBJECT TO AUTHORIZATION BY A DATA CONTROLLER

RELATED APPLICATION DATA

The present disclosure is a continuation of U.S. patent application Ser. No. 09/559,778, filed on Apr. 27, 2000, now U.S. Pat. No. 7,617,125, which is a continuation-in-part application related to U.S. Patent Application entitled "A System and Method for Merchant Invoked Electronic Commerce", Ser. No. 09/167,873, filed Oct. 7, 1998, now U.S. Pat. No. 6,092,053, from which priority is claimed.

FIELD OF THE INVENTION

This invention relates generally to a method and system where certain information pertaining to a data subject is stored on a server and is provided to a third party at the request of the data subject. More particularly, the present invention relates to a method and system where certain data subject information is stored on a server and is associated with a third party controller. The information may be provided to the controller, or to an party authorized by the controller (an "authorized data recipient"), thereby allowing the data subject to deliver information related to the data subject over a network in an easy and safe manner.

BACKGROUND OF THE INVENTION

The essence of electronic commerce is the exchange of information. The most common form of electronic commerce entails the purchase of products over the Internet using a credit card. Information necessary to consummate a credit card transaction includes the data subject's name, address, credit card information, and the amount to be charged. While the term "electronic commerce" is generally associated with the purchase of goods and services over the Internet, the term encompasses other transactions as well. For example, applications for insurance, college admissions, and loans are transactions that are not purchase transactions. Hence the term "transaction" is generally used herein to describe all manner of interactions over a network of the type noted above. The common element to all transactions is the transfer of data from one party to another.

A person who wants to send personal data (the "data subject") can either type in the required information each time a transaction is consummated or store the data for retrieval. Typing in data is not only inefficient and prone to errors, but discourages Internet commerce. Using a local software solution is generally considered undesirable, as most such software programs are proprietary to a particular payment system, require the data subject to become skilled in the operation of the program, and are perceived as slow or unwieldy.

Repositories of data subject information exist in the "brick and mortar" world as well as the virtual world of the Internet. Associations like AARP and AAA have large membership databases. Some merchant sites on the web require data subjects to "register" with the merchant. These collections of data subject data have value outside their original purpose of facilitating purchasing. For example, a merchant may provide a registered data subject with certain member benefits. The holder of this data subject data may also exploit this information selling it to third parties for marketing purposes.

While databases of data subject information are inherently valuable, it is not easy for a controller of one of these databases to provide a data subject access to his or her data in a way that facilitates Internet commerce. Even if a data controller could make data subject information available to a data subject, the data controller would have to deal with the costs associated with providing the means of capturing the data subject data needed for a particular transaction and associated with protecting the data. Finally, if a data controller managed to make its data usable for commerce, it might prove difficult to leverage that data by making it available to others authorized by the controller to receive it.

Therefore, a need exists for a system that allows a controller of data subject information (the "data controller") to collect and securely store information from data subjects and to make data subject information available to the data subject to send selected information to the controller or to an authorized data recipient which could for the purposes of the application be a merchant, a college in case of application information, and other situations where information must be repetitively provided to a plurality of recipients. over the Internet in a manner that offers security and allows access from any computer. A system to provide this for merchants is disclosed in copending application Ser. No. 09/167,873, filed Oct. 7, 1998, incorporated herein by reference in its entirety. The present invention expands upon this system to data controllers and authorized data recipients.

SUMMARY OF THE INVENTION

It is therefore an object of the present invention to reduce the number of steps a data subject is required to perform in order to complete a transaction over any network.

A further object of the present invention is to reduce the number of steps a data subject is required to perform in order to complete a transaction over the Internet.

A further object of the present invention is to eliminate storage and retrieval software that is permanently stored on the data subject's computer used generally herein as a "network communication device" or NCD.

A further object of the present invention is to create a data repository for storing data subject information that can be operated by a data controller and accessed easily and transparently by a data subject.

A further object of the present invention is to allow authorized data recipients to access purchasing information relating to data subjects who are registered with data controllers without requiring a new registration.

A further object of the present invention is to allow authorized data recipients to register new data subjects whose data will reside with data controllers in a data repository.

A further object of the present invention is to allow a data subject to conduct transactions using data stored in the data repository from any computer connected to the network on which the data repository resides.

A further object of the present invention is to use the data repository to aid the data subject in distributing all manner of information, not just purchase/money information, to a variety of recipients when those recipients are to receive essentially the same information from one recipient to the next.

A further object of the present invention is to provide a mechanism for direct marketing or distribution of relevant information to data subjects immediately before, during, or after completion of a transaction using a the data repository.

The present invention is a system for presenting a data subject's information to an authorized data recipient's computer to allow transactions to be consummated. The transaction may be the simple transmission of selected data subject information or for a purchase and sale of goods or services. The nature of the transaction will determine what data subject data is stored and presented. The system comprises a network communication device (NCD) associated with a data subject (the "data subject's NCD"), a computer associated with an authorized data recipient (the "authorized data recipient's computer"), and a server (the "data repository") on which the necessary and desirable information about the data subject is stored. The data subject's NCD, the authorized data recipient's computer, and the data repository are connected to a network, such as, but without limitation, the Internet, and communicate using communication protocols. The data subject's NCD can interpret and process files from the data recipient's computer and the data repository using software resident on the data subject's NCD (the "NCD software"). The authorized data recipient's computer operates a web server, provides transaction processing, and performs other functions. The authorized data recipient's computer may be a single device, or may, at the authorized data recipient's discretion comprise a number of devices that may or may not be co-located. The authorized data recipient's computer also operates software ("client software") that communicates with the data repository. The data repository, which is controlled by a data controller, operates data repository software, which provides access to information stored in various databases, logs, and/or datastructures of the data repository. Data controllers specify a list of authorized data recipients to the data repository with whom the data controllers' registered data subject information can be shared. Note that if the data controller is also a user of data subject information, the data controller will be acting as an authorized data recipient.

The present invention allows data subjects to send transaction information over a network and allows authorized data recipients to receive data subject information relating to that transaction. In the preferred embodiment, the transaction involves the purchase of goods and services. The network connecting the data subject's NCD, the authorized data recipient's computer, and the data repository is the Internet, and the transaction data is purchasing data. However, the invention is not limited to a purchase transaction. As noted earlier, other types of transactions where information is exchanged is within the scope of the present invention.

During the web surfing process, a data subject browses an authorized data recipient's Web site via the data subject's NCD. The NCD may be any communications device connected to the network. In this example, it is assumed that the NCD is a computer. The authorized data recipient's Web site invites the data subject to send a set of data subject information to the authorized data recipient thereby consummating a transaction (an "offer").

The authorized data recipient's Web site also operates client software. When the data subject accepts the authorized data recipient's offer to consummate a transaction, the client software sends both a file readable by the NCD software and the authorized data recipient's offer to the NCD software that is resident on the data subject's NCD. The NCD software readable file includes information to identify the authorized data recipient, an address for the authorized data recipient's Web page and instructions that instruct the NCD software to communicate with the data repository software. The authorized data recipient's offer passes through the data subject's NCD to the data repository software resident on the data repository.

The data repository software verifies that the authorized data recipient is known to the data repository and identifies the data controllers that have authorized the authorized data recipient to receive data subject information. The data repository then returns a message to the NCD software and instructs the NCD software to display a dialog box within an area reserved for the dialog box within the authorized data recipient's Web page. The content of this dialog box depends on whether or not the data subject is known to the data repository software.

If the data subject is known to the data repository software, because of prior registration of the data subject, the data repository software determines if the data subject was registered by or in association with a data controller and if that data controller has authorized the authorized data recipient that sent the offer to receive the data subject's information. If the authorized data recipient is so authorized, the data repository software takes information contained in the authorized data recipient's offer, formats the information to allow the NCD software to display the authorized data recipient's offer, and sends the authorized data recipient's offer to the data subject's NCD where the authorized data recipient's offer is displayed by the NCD software in a dialog box within the area reserved for the dialog box within the authorized data recipient's Web page. The data subject is prompted to decide whether or not to complete the transaction. Typically, this communication occurs by the data subject clicking on an object resulting in a message being communicated to the data repository.

If the data subject elects to complete the transaction, the data repository software forwards the data subject's information to the authorized data recipient's computer. The information includes information from the authorized data recipient's offer and the data subject's information (e.g., credit card number, address, shipping address, social security number, etc.) that is stored on the data repository. The authorized data recipient's computer then uses the information to complete the transaction.

If the data subject is unknown to the data repository software, or if the data subject is known to the data repository software but the authorized data recipient sending the offer is not authorized by the data controller associated with the data subject to receive such data subject information, the data repository software sends a form to the data subject's NCD which is displayed in a dialog box within the area reserved for the dialog box within the authorized data recipient's Web page. The form prompts the data subject to provide the information necessary to complete the transaction. Once the data subject provides sufficient information to complete the transaction, the data repository software prompts the data subject to complete the transaction.

If the data repository software does not know the data subject, the data subject may be asked to register with the data repository under several scenarios. For example, the data subject may have reached the authorized data recipient's page through a link associated with the data controller. If the authorized data recipient is authorized by the data controller to receive data subject information, at the completion of the transaction with the authorized data recipient the data subject may be prompted to elect to have the information retained on the data repository for future use (the process herein referred to as "registration"). If the data subject answers "no", then the information is stored in a temporary data structure. Information stored in the temporary data structure is retained for a set amount of time and is not available for reuse by the data subject. If the data subject answers "yes", then the information pertaining to the data subject is stored in a data structure intended for the retention and future use by the data subject and becomes a registered data subject of the data controller.

The registration process is disclosed in copending application Ser. No. 09/167,873, filed Oct. 7, 1998, incorporated herein by reference in its entirety.

If the data subject elects to register with the data repository software, during the registration process, the NCD software is sent an NCD software identifier. In the preferred embodiment, the NCD software is a browser and the browser identifier is a cookie. The NCD software identifier contains data that are crypto graphically protected to enhance security. The NCD software identifier allows the data repository software to identify the NCD software and permits a data subject to authenticate himself or herself, thereby permitting the data repository software to use the data subject's stored information in future transactions.

The system also allows data subjects who are registered on a different NCD to authorize the data repository software to use the data subject's stored information. This situation occurs when the data repository software cannot identify the NCD software identifier because there is no NCD software identifier in the NCD software or the NCD software identifier cannot be used to identify the particular data subject using the NCD software.

Since the system of the present invention establishes communication links between the authorized data recipient's computer and the data repository, the system can be optimized in several respects. For example, the price of goods or services may be affected by the relationship between the data controller and authorized data recipients, the location to which the item is to be shipped, the method of shipping, and by tax obligations. The data repository software communicates information pertaining to the data subject to the authorized data recipient's computer permitting the authorized data recipient's computer to determine a "final" price based on the data subject's information, i.e., shipping address and/or preferences.

Another example of optimization is the ability of the data repository software to present a data controller or authorized data recipient's brand, both brands, or other "brand" to the NCD software. If the data subject is making a purchase (first or repeat) at a authorized data recipient Web site, a top graphic and colors used by the data repository prompt can be specified by the authorized data recipient offer and a bottom graphic used by the data repository prompt can be specified in accordance with the data controller involved. The data repository software can also associate a data subject with an identification code that can be presented to the authorized data recipient's computer, thus allowing the authorized data recipient to "recognize" a data subject and provide customer-specific messages, displays, and offers. The data repository software can tailor its communication with the data subject's NCD in accordance with a profile created by the data repository software. The profile is based upon preferences chosen by the data subject or created by the data repository software based on the data subject's behavior, from preferences chosen by the data controller or authorized data recipient, by a branding party, or the like.

With respect to data subjects, the system is optimized to provide all of the transaction information to the data subject thereby allowing the data subject to verify the information and make a decision to complete a transaction without further information input from the data subject. The system can also establish a dialogue between the data subject's NCD and the data repository to permit the data subject to select from options such as which credit card to use, the shipping address, and the shipping means.

The relationship between the data controller and authorized data recipient further allows the customer to shop at a wider variety of authorized data recipients without having to repeatedly register with each one.

DETAILED DESCRIPTION OF PREFERRED EMBODIMENT

For the purpose of this application, the term software is deemed to include instructions.

Figure 1:
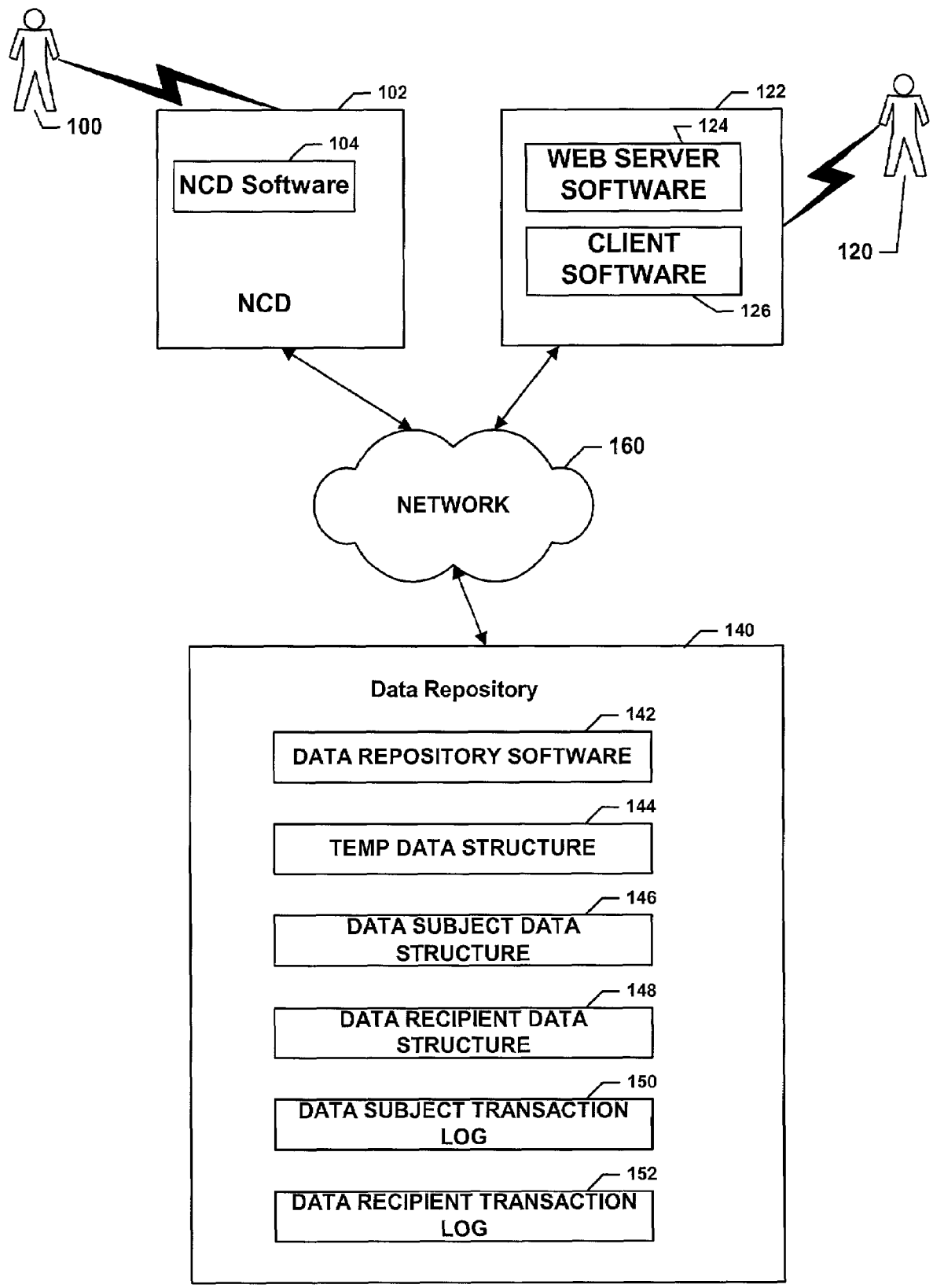
FIG. 1 illustrates the overall architecture of the present invention.

Referring to FIG. 1, the overall architecture of the present invention is illustrated. The present invention allows data subject 100 to conduct a transaction over network 160 and allows authorized data recipient 120 of a data controller (not shown) to receive information relating to the transaction.

To complete a transaction, data subject 100 uses data subject network communication device ("consumer's NCD") 102. Data subject's NCD 102 can be a computer or a wireless device and operates software that is either a Web browser or emulates a Web browser (the "NCD software") 104. In either case, the NCD software has the requisite capability of displaying the information supplied by data recipient computer 122. The NCD software 104 allows data subject 100 to download and display Web pages or other information from the authorized data recipient's computer 122.

To receive information relating to the transaction, authorized data recipient 120 uses authorized data recipient's computer 122. Data recipient's computer 122 operates Web server software 124 and client software 126. Web server software 124 displays an authorized data recipient's Web pages. Client software 126 allows authorized data recipient 120 to communicate with the data repository (the "data repository") 140. An authorized data recipient may be an authorized data recipient for multiple data controllers, but only needs to load a single copy of the client software 126.

In the preferred embodiment, data repository 140 is under the control of a data controller although this is not meant as a limitation since the data repository need not be under control of the a data controller but can operate independently. However, for this embodiment the data repository is under the control of a data controller and comprises data repository software 142 which gathers and stores the transaction information of data subjects registered with a data controller (or on behalf of a data controller through a authorized data recipient) to complete a transaction over common network 160, temporary data structure 144 which stores data subject information for a limited amount of time and cannot be used in future transactions, data subject data structure 146 which stores data subject information associated with a data controller that can be used in future transactions, authorized data recipient data structure 148 which stores information pertaining to the data controller or authorized data recipient, data subject transaction log 150 which stores information pertaining to the transactions for registered data subjects, and authorized data recipient transaction log 152 which stores information pertaining to transactions for registered and non-registered data subjects.

Consumer NCD 102, data recipient's computer 122, and data repository 140 are connected to common network 160. The present invention can operate over various types of common networks both wired and wireless. The present invention can operate over the Internet, cable systems, satellite systems, wireless networks, intranets, LANS, and WANS however this list should not be construed as a limitation. In the preferred embodiment, the common network is the Internet.

It should also be noted that a network 160 may actually comprise more than one network. This would be the case where the data subject's NCD is a wireless device which must first communicate over a wireless network and then over the Internet.

Data repository software 142 gathers and stores the information needed to complete a transaction over common network 160. Data repository software 142 gathers the information directly from data subject 100, from data subject data structure 146 or from both.

Temporary data structure 144 stores information relating to a particular interaction between data subject 100 and authorized data recipient 120.

Authorized data recipient data structure 148 stores information relating to authorized data recipients associated with the data controller, including authorized data recipient 120, that have completed the registration process with the operator of data repository 140 (either directly or through the authorized data recipient on behalf of a data controller). The information in authorized data recipient data structure 148 represents information that is necessary to identify authorized data recipient 120 and authorized data recipient computer 122. This information also includes contact information, authorized data recipient identification number, data controller information, network location(s) for the authorized data recipient computer 122, the type of transaction accepted, accepted payment card types, accepted currencies, and payment methods (e.g., electronic check, micropayments). This list of information should not be construed as a limitation and is illustrative only.

Consumer transaction log 150 stores information relating to transactions performed by registered data subjects. Authorized data recipient transaction log 152 stores information relating to transactions performed by registered and non-registered data subjects, including data subject 100. The operator of data repository software 142 can allow data subjects and authorized data recipients access to the information contained in their respective data structures as deemed necessary. For instance, data subject 100 can be given a summary of the data subject's transactions over a period of time. Authorized data recipient 120 can be given a summary of the authorized data recipient's transactions over a period of time.

Figure 2A:
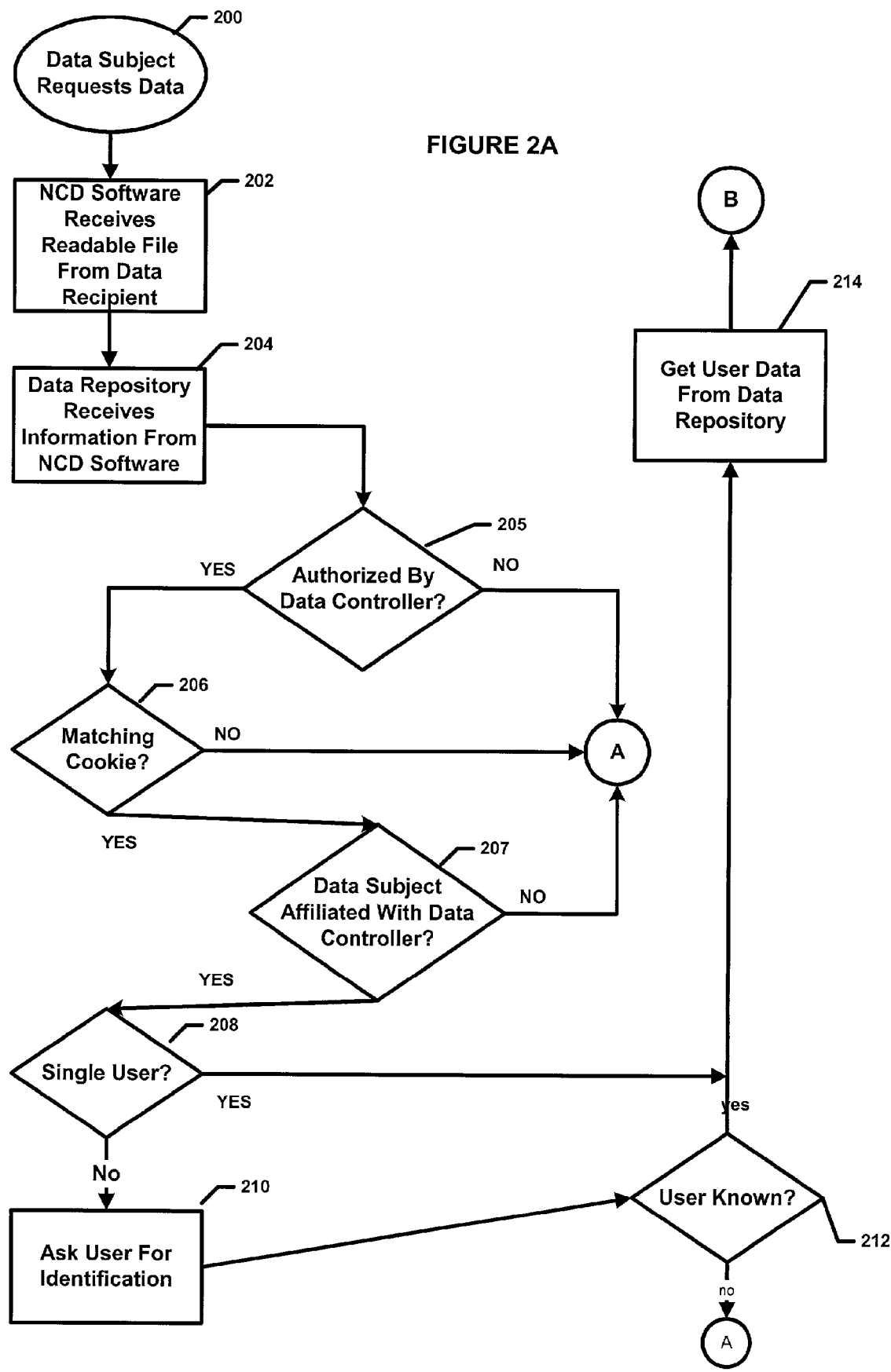
FIG. 2A illustrates the process of consummating a transaction over a network.

Referring to FIG. 2A, the process of purchasing an item over a network is illustrated. The following process is the preferred embodiment of the present invention. In alternate embodiments, similar processes can occur in different orders. Additionally, a transaction involving the exchange of information may involve the storage and retrieval of data different from that described in the following example.

In the preferred embodiment, data subject 100 and authorized data recipient 120 are registered with and known to data repository 140. The process by which data subject 100 becomes registered and the handling procedures in the even one or both are not registered are described in copending application Ser. No. 09/167,873, filed Oct. 7, 1998, incorporated herein by reference in its entirety.

The purchasing process starts with a data subject requesting a authorized data recipient's offer 200 from a authorized data recipient. In response to the data subject's request, the authorized data recipient's computer responds by sending both a file that is readable by the NCD software and the authorized data recipient's offer to the data subject's NCD 202. The NCD software processes the browser readable file and sends the authorized data recipient's offer and a message which is received by data repository 204. The authorized data recipient's offer includes the following information, however this information is not meant as a limitation since other data types may also be useful: authorized data recipient identifier, price of the item, a form of digital signature of the authorized data recipient, a final price indicator, and a transaction number. The authorized data recipient identifier identifies the authorized data recipient who is offering the item for sale. The identifier is used to confirm that the authorized data recipient is known to the data repository and to associate the authorized data recipient with one or more data controllers 205. The price of the item is cost to purchase the item. A digital signature of the authorized data recipient is used to ensure the validity of the offer. The final price indicator is used to indicate whether the final cost for the item is affected by the data subject's shipping address and/or shipping preference. The transaction number is used for tracking purposes. The transaction number does not contain any product identifying information. The transaction number acts as an identifier for identifying a transaction.

The message sent from the NCD software to the data repository indicates whether the browser contains a browser identifier (an NCD software identifier). In the preferred embodiment, the browser identifier is a cookie and comprises a unique identifier that differentiates it from all other identifiers. A browser identifier identifies the data subject browser on a specific data subject computer. The data repository software receives and processes the message to determine if the NCD software contains an identifier that identifies a data subject that matches a data entry in a file in the data subject data structure of the data repository 206.

The data repository software also determines whether a single user or multiple users have used the NCD software by checking the data subject data structure and by permitting data subjects to access their data from remote computers. The processes by which these features are implemented are described in detail in copending application Ser. No. 09/167,873, filed Oct. 7, 1998, incorporated herein by reference in its entirety.

If the data repository software determines that the information provided by the data subject matches the information the data subject supplied during registration, then using the authorized data recipient identifier included in the offer sent to data subject computer (FIG. 1, 102) by authorized data recipient computer (FIG. 1, 122), the data repository software will determine if the authorized data recipient that delivered the offer to the data subject has been authorized by the data controller to receive data subject information stored on the data repository 207.

If the data repository software determines that the information provided by the data subject matches the information the data subject supplied during registration and the authorized data recipient is authorized by the data controller, then the data repository software accesses and gathers the data subject's information which is stored in the data subject data structure 214.

If the data repository software determines that more than one user is using the data subject's NCD 208, the data repository software asks for user identification 210. Based on the user information, the data repository determines if the user is known 212. If so, user data is retrieved from the data repository. If the user is not known, the data repository prompts the use to enter further information to become registered or to provide information to complete the transaction.

Figure 2B:
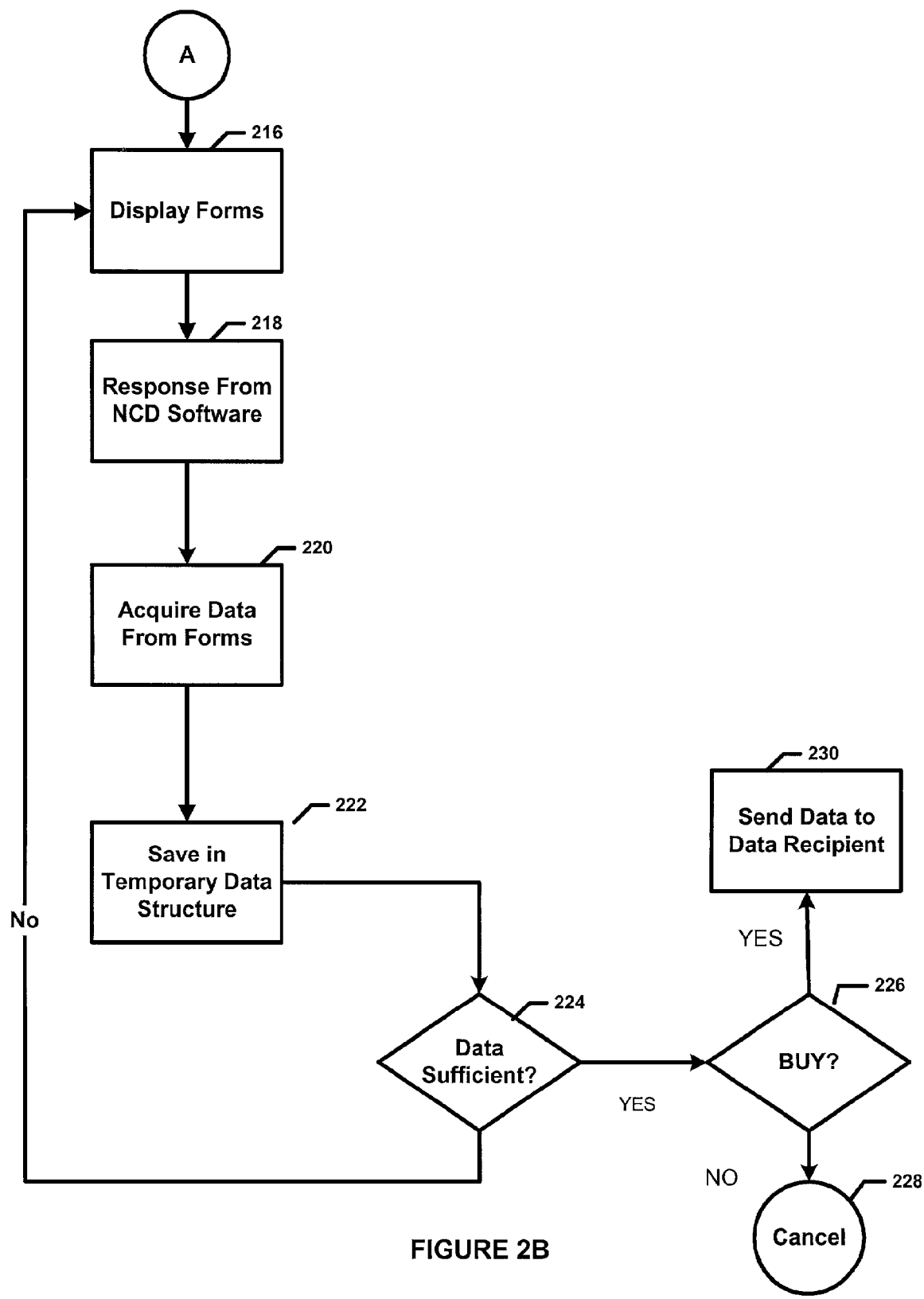
FIG. 2B illustrates the process of consummating a transaction over a network (continued).

Referring to FIG. 2B, the process flow continues. If the data repository software determines that the information provided by the data subject is insufficient to identify the data subject or that the data subject and data recipient are not associated with a common data controller, then the data repository software prompts the data subject for the purchasing information to complete the transaction by displaying forms to be completed 216. The response from the NCD software is received by the data repository 218.

The data repository software extracts the data from the completed forms 220 and stores the data in a temporary data structure 222. The information acquired from the forms is evaluated to determine if the information from the data subject is sufficient to complete the purchase transaction 224. This step includes the data repository software accessing the authorized data recipient data structure using the authorized data recipient identifier to ensure that the data subject's purchasing information is in proper order, i.e., to check that the data subject's credit card accepted by the authorized data recipient. If the information is not sufficient, the data subject is prompted for the information again 216. The operator of the data repository can set the number of iterations that the data subject is prompted for the information. If the data is sufficient, the data subject is asked to purchase the item 226. If the data subject declines the transaction, the dialog ends 228. If the data subject decides to buy the item, the data collected in the form is sent to the data recipient 230. However, the transaction data is not permanently stored at the data repository.

Figure 2C:
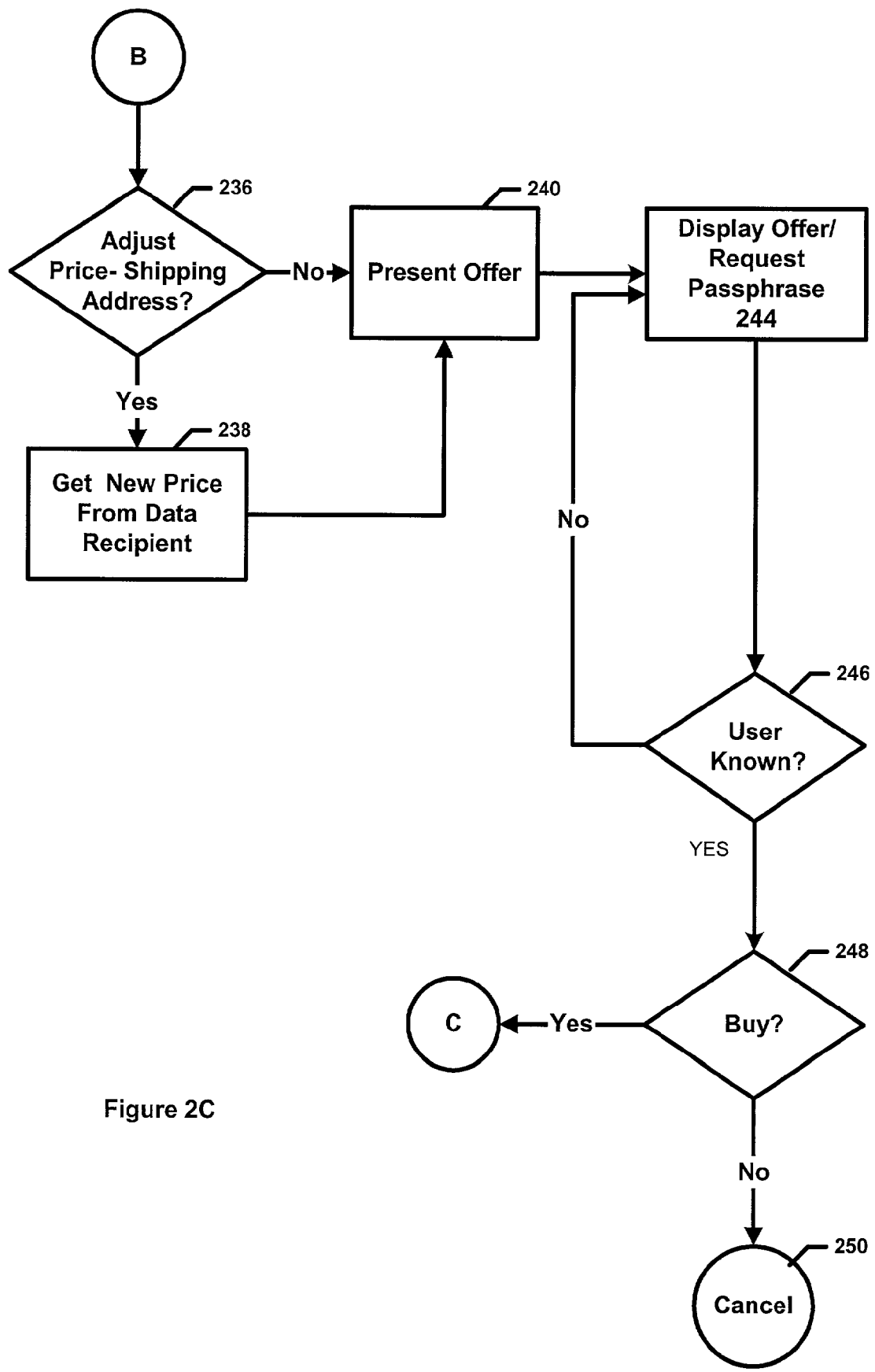
FIG. 2C illustrates the process of consummating a transaction over a network (continued).

Referring to FIG. 2C, the process flow continues. Once the data repository software determines that the data subject's information is sufficient to complete the purchase transaction, the data repository software then determines if the price of the item needs to be adjusted for shipping costs 236. If price adjustment is required, new price information is obtained from the authorized data recipient 230. The revised offer is then presented to the data subject 240. If no price adjustment is required 236, the final offer is presented to the data subject 240. The system next displays the offer and determines if the data subject needs to enter a passphrase. If the data subject is a registered data subject of the data controller who has not gone through the authentication process yet, then offer is then augmented with a prompt for the user to enter the data subject's passphrase 244. The data repository software evaluates the entered passphrase against data held in the data subject data structure 246 to determine if the data subject is known (registered) by the data repository software. If the passphrase does not match, then the data subject is prompted for the correct passphrase 244. The operator of the data repository can set the number of iterations that the data subject is prompted for a correct passphrase to avoid multiple fraudulent attempts to access information.

Once the data subject enters a correct passphrase or if there was no browser identifier for the data subject, the data subject is presented with a buy decision 248. The data subject has several options available at this step: the data subject can elect to buy the item, change the data subject's information and buy the item, or cancel the transaction. If the data subject elects to change the data subject's information, the data subject must still decide to either buy the item or cancel the transaction after changing the information. If the data subject declines to purchase the item, then the transaction is canceled 250, and the information held in the temporary data structure is deleted, the dialogue ends and the transaction is terminated 250.

The data subject also has the option of changing the data subject's information. The data subject may wish to change such information for such reasons as the data subject does not agree with the selection by the data repository software or the information contains an error. For instance, if the data subject wishes to change the shipping address, the data subject can enter a new shipping address. In some instances, the data subject can have a plurality of possible entries into the same information block with a preferred entry. In such a situation, the data repository software chooses the preferred information to enter into the information block. The data repository software chooses the information via any selection process known in the art, such as most popular, last used, first used, etc. However, the data repository software cannot enter information into an information block if the authorized data recipient will not allow such an entry. For instance, a authorized data recipient may only accept the ACME credit card and the data subject has not previously used an ACME credit card to purchase an item using the present invention. In such a situation the data repository software prompts the data subject to provide an acceptable form of payment. Information options are available to the data subject in the form of directory of addresses, shippers, shipping methods, credit cards, and other information options.

Figure 2D:
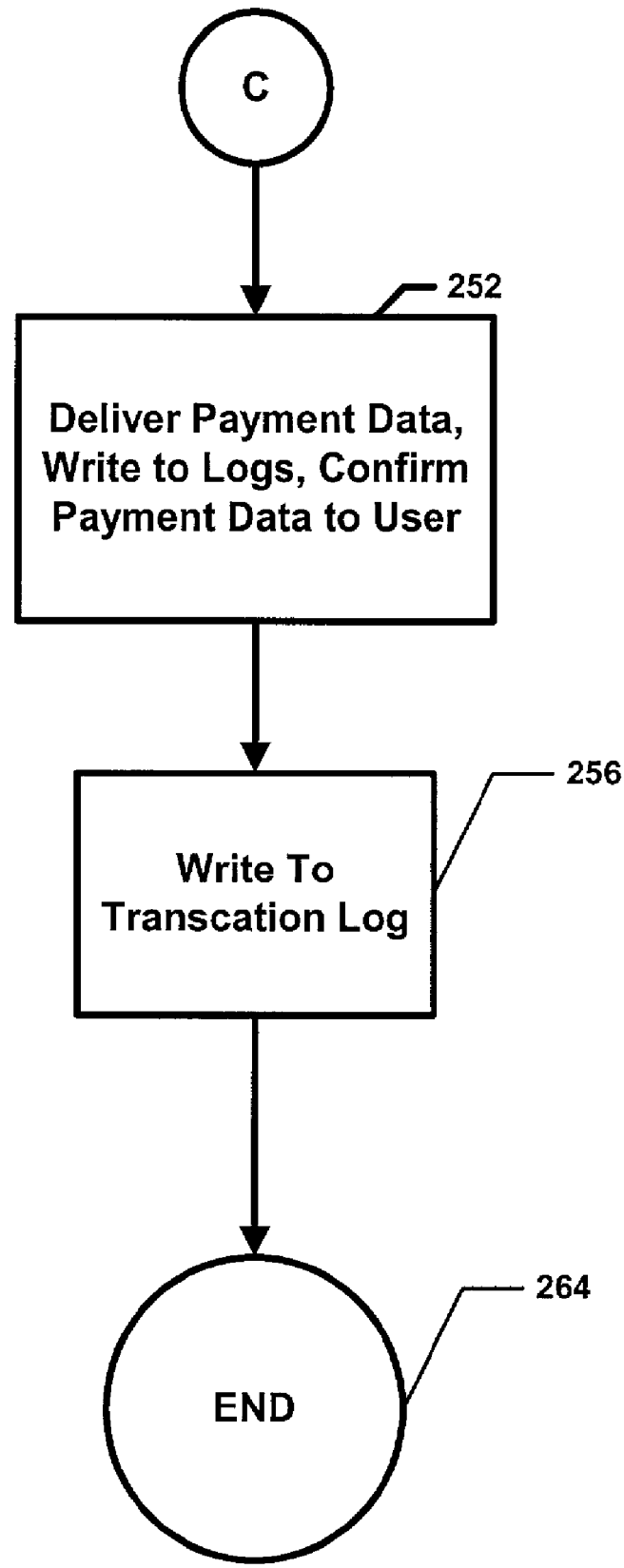
FIG. 2D illustrates the process of consummating a transaction over a network (continued).

Referring to FIG. 2D, if the data subject elects to purchase the item, then the information regarding the transaction is delivered to the authorized data recipient's computer, information is written to the authorized data recipient transaction log, and a message confirming the transaction is sent to the data subject's NCD 252. The information regarding the transaction is written to the data subject transaction log 256.

The transaction process ends 264.

If a data subject is registered with more than one data controller and attempts to make a purchase with a authorized data recipient common to both data controllers, the data subject registration used to make the purchase is determined by the authorized data recipient and can be determined, for example, according to the particular area of the authorized data recipient Web site accessed by the data subject or according to the previous or linking site used by the data subject.

Although the above description is directed at purchasing an item over the Internet, the same concept of distribution of information can be applied to other areas.

In all of these different type of embodiments, the communications between the different parties can be encrypted in any manner known in the art. In addition, some of the communications can be accomplished in different manners. For example, in an alternate embodiment of the preferred embodiment, communications between the data repository and the authorized data recipient computer can occur using a separate communication link. The communication link can be a direct link between the authorized data recipient and the data repository. Using this separate link can ensure against unauthorized transactions.

Although the present invention has been described in detail for purpose of illustration, it is understood that such detail is solely for that purpose, and variations can be made therein by those skilled in the art without departing from the scope of the invention. The preceding descriptions of the operations of the present invention are merely illustrative. In various embodiments of the disclosed inventions operational steps may be added, eliminated, performed in parallel or performed in a differing order. The apparatus and process of the present invention is defined by the following claims.

We claim:

1. A system for purchasing an item over a computer network, comprising:
   a data subject computer, coupled to the network;
   a data recipient computer, coupled to the network; and
   a server, including a processor, said server coupled to the network and independent of the data recipient computer, including at least one data controller managing a database and data repository software to:
   receive, from a data subject, an offer associated with the item and with a data recipient computer, and including a data recipient identifier identifying the data recipient in the database of a controller, and a message including a data subject identifier, the offer originating from the data subject accessing a Web page of the data recipient, and
   if the data subject computer is registered and the database includes information that indicates that the data recipient identifier and the data recipient computer is authorized:
      retrieve purchasing information associated with the data subject from the database, said purchasing information having been stored in the database during a previous transaction,
      send a buy decision to the data subject, the buy decision presenting a choice between purchasing the item, changing the purchasing information, or declining to purchase the item, and
      in response to the buy decision received from the data subject computer comprising an election to purchase the item, send the purchasing information to the data recipient computer.

2. The system of claim 1, wherein the offer includes an item price, a data recipient digital signature to ensure validity of the offer, a final price indicator and a transaction number.

3. The system of claim 2, wherein the purchasing information associated with the data subject includes credit card information and shipping information, the shipping information including a shipping address and a shipping method.

4. The system of claim 3, wherein the data repository software is further adapted to:
   determine whether the credit card information is accepted by the data recipient computer.

5. The system of claim 4, wherein the data repository software is further adapted to:
   obtain a new price from the data recipient computer based on the shipping address and the shipping method; and
   set the item price equal to the new price.

6. The system of claim 1, wherein the data repository software is further adapted to:
   prompt the data subject computer for a passphrase; and
   authenticate the data subject computer based on a passphrase stored within the database.

7. The system of claim 1, wherein the data repository software is further adapted to:
   store the transaction information in an authorized data recipient transaction log.

8. The system of claim 1, wherein the data repository software is further adapted to:
   store the transaction information in a data subject transaction log.

9. The system of claim 1, wherein the data repository software is further adapted to:
   send a transaction confirmation message to the data subject computer.

\* \* \* \* \*